United States Patent Office 2,816,078
Patented Dec. 10, 1957

2,816,078

SUSPENSIONS OF SPONGE BLOWING AGENTS

Seymour W. Ferris, Mount Holly, N. J., assignor to Sun Oil Company, Philadelphia, Pa., a corporation of New Jersey No Drawing. Application October 23, 1956, Serial No. 617,684

4 Claims. (Cl. 252—309)

This invention relates to an improvement in the preparation of suspensions of ammonium or alkali metal carbonate or bicarbonate sponge blowing agents in mineral oil.

It is known in the art to prepare suspensions of carbonate and bicarbonate sponge blowing agents in mineral oils and to use such suspensions in the compounding of sponge rubber. Introduction of the blowing agent into the rubber composition as a mineral oil suspension has certain advantages as recognized in the prior art.

Carbonate and bicarbonate sponge blowing agents, when admixed with mineral oil in the proportions suitably employed, e. g. 50 parts by weight of blowing agent and 50 parts by weight of oil, do not form stable suspensions. The present invention provides an improvement in the preparation of the suspension whereby a highly stable suspension is obtained.

According to the present invention, colloidal silica is employed in the preparation of suspensions of inorganic sponge blowing agents in mineral oil, and is incorporated in the suspensions prepared. The suspensions prepared are highly useful in the compounding of sponge rubber. The colloidal silica, upon incorporation in the sponge rubber product, may impart advantageous properties thereto, increasing the abrasive quality and wear resistance of the sponge rubber.

The colloidal silica used according to the invention has average particle size not exceeding 0.1 micron. A minor proportion of the silica is employed in the composition. Preferred compositions are the following:

|  | Parts by weight |
| --- | --- |
| Mineral oil | 20 to 70 |
| Blowing agent | 20 to 70 |
| Colloidal silica | 0.1 to 10 |

More preferably, the compositions are as follows:

|  | Parts by weight |
| --- | --- |
| Mineral oil | 35 to 60 |
| Blowing agent | 35 to 60 |
| Colloidal silica | 0.5 to 5 |

In general, any suitable rubber processing oil may be employed in the compositions according to the invention.

In one embodiment of the invention, ordinary hydrophilic silica gel or silica aerogel having colloidal particle size is employed. In another embodiment, silica gel or silica aerogel which has been rendered hydrophobic by suitable known means is employed. Examples of suitable hydrophobic silica gels are the silica gels waterproofed with hydrolyzed and polymerized amino-silane as disclosed in Patent No 2,583,606, issued January 29, 1952, to A. F. Sirianni et al.; the silica gels waterproofed with a linseed oil modified alkyd resin as disclosed in Patent No. 2,583,605, issued January 29, 1952, to A. F. Sirianni et al.; the surface-esterified silicas as disclosed in Patent No. 2,657,149, to R. K. Iler; the silica gels waterproofed with silane compounds as disclosed in Patent No. 2,614,135, issued October 14, 1952, to A. E. Hirschler; the hydrophobic silicas as disclosed in Patent No. 2,614,993, issued October 21, 1952, to V. I. Montenyohl et al., etc.

The following example illustrates the invention:

A suspension of sodium bircarbonate in mineral oil was prepared having the following approximate composition:

|  | Parts by weight |
| --- | --- |
| Mineral oil | 50 |
| Sodium bicarbonate | 50 |
| Hydrophobic silica | 3 |

The mineral oil was "Circo Light" process oil, a rubber processing oil having S. U. viscosity at 100° F. of 189 seconds. The sodium bicarbonate was the anhydrous sodium bicarbonate of commerce, a fine powder. The hydrophilic silica was colloidal hydrophobic silica having average particle size about 0.01 micron, prepared as described in the previously cited Hirschler patent. The suspension was made by homogenizing the constituents in the stated proportions in a Waring blendor.

The suspension obtained was homogeneous and stable. Upon standing for more than a month, no substantial separation of solid material from the suspension occurred. By way of comparison, a suspension consisting of 50 parts by weight of the Circo Light and 50 parts of sodium bicarbonate, prepared in the Waring blendor, was very unstable, the sodium bicarbonate settling out almost immediately.

This example shows that a small amount of colloidal hydrophobic silica is very effective in stabilizing a suspension of an inorganic sponge blowing agent in mineral oil. Generally similar results are obtained using colloidal hydrophilic silica.

Stable suspensions containing larger amounts, e. g. up to 70 percent, or smaller amounts, e. g. down to 20 percent, of blowing agent can be prepared in a generally similar manner to that disclosed in the preceding example.

This application is a continuation-in-part of application Serial No. 398,219, filed December 14, 1953, now abandoned, by the present inventor.

The invention claimed is:

1. A sponge blowing composition comprising a major amount of a dispersion of 20 to 70 parts by weight of an inorganic sponge blowing agent selected from the group consisting of ammonium carbonate, alkali metal carbonate, ammonium bicarbonate, and alkali metal bicarbonate in 20 to 70 parts by weight of mineral oil; and 0.1 to 10 parts by weight of colloidal silica having particle size not substantially exceeding 0.1 micron, the amount of said silica being sufficient to stabilize said dispersion.

2. Composition according to claim 1 wherein said composition contains 35 to 60 parts by weight of said blowing agent, 35 to 60 parts by weight of mineral oil, and 0.5 to 5 parts by weight of said silica.

3. Composition according to claim 1 wherein said silica is hydrophilic silica.

4. Composition according to claim 1 wherein said silica is hydrophobic silica.

References Cited in the file of this patent

UNITED STATES PATENTS

| 2,544,483 | Baum | Mar. 6, 1951 |
| 2,748,081 | Peterson et al. | May 29, 1956 |
| 2,760,941 | Iler | Aug. 28, 1956 |